United States Patent [19]

Minnick et al.

[11] 3,909,622

[45] Sept. 30, 1975

[54] MAGNETIC BUBBLE TWO-RAIL LOGIC GATES

[75] Inventors: Robert C. Minnick, Ouray, Colo.; Robert M. Sandfort, St. Charles, Mo.

[73] Assignee: Monsanto Company, St. Louis, Mo.

[22] Filed: Mar. 22, 1974

[21] Appl. No.: 453,784

[52] U.S. Cl... 307/88 LC; 340/174 TF; 340/174 SR

[51] Int. Cl.[2] .......................................... H03K 19/168

[58] Field of Search ................ 340/174 TF, 174 SR; 307/88 LC

[56] References Cited

UNITED STATES PATENTS

| | | | |
|---|---|---|---|
| 3,743,851 | 7/1973 | Kohara | 340/174 TF |
| 3,798,607 | 3/1974 | Minnick et al. | 340/174 TF |

OTHER PUBLICATIONS

IBM Tech. Disc. Bull., "Bubble Domain Logic Circuits" by Lin, Vol. 13, No. 10, 3/71; pp. 3019, 3020.
IBM Tech. Disc. Bull., "Multiple Input Magnetic Bubble "AND" Gate" by Sakalay, Vol. 14, No. 12, 5/72; pp. 3691, 3692.

*Primary Examiner*—Stanley M. Urynowicz, Jr.
*Attorney, Agent, or Firm*—Lane, Aitken, Dunner & Ziems

[57] ABSTRACT

Two-rail logic gates realizing AND-NAND and OR-NOR logic functions of two input variables are provided by four closely spaced bubble channels representing the variables and their complements linked by staggered conditional, bubble-transfer fields between adjacent channels responsive to bubble interaction.

12 Claims, 4 Drawing Figures

MAGNETIC BUBBLE TWO-RAIL LOGIC GATES

BACKGROUND OF THE INVENTION

The invention relates generally to the field of magnetic bubble technology (MBT), and more specifically to logic circuits exploiting bubble interactions.

MBT involves the creation and manipulation of magnetic bubbles in specially prepared magnetic materials. The word "bubble," used throughout this text, is intended to encompass any single-walled magnetic domain, defined as a domain having an outer boundary which closes on itself. The application of a static, uniform magnetic bias field orthogonal to a sheet of magnetic material having suitable uniaxial anisotropy causes the normally random serpentine pattern of magnetic domains to shrink into isolated, short cylindrical configurations or bubbles whose common polarity is opposite that of the bias field. The bubbles repel each other and can be moved or propagated by a magnetic field in the plane of the sheet.

Many schemes exist for propagating bubbles along predetermined channels at a precisely determined rate so that uniform data streams of bubbles are possible in which the presence or absence of a bubble at a particular position within the stream indicates a binary "1" or "0". These techniques can be classed generally as conductor-accessed and field-accessed. In conductor-accessed propagation systems, electrically pulsed conductive loops are disposed in series over the magnetic sheet. In field-accessed propagation systems, electrical conductors are not disposed on a magnetic sheet for propagation; instead, an overlay pattern of ferromagnetic elements establishes a bubble propagation channel in which a sequence of attracting poles is caused to be formed in the presence of a continuous uniformly rotating magnetic drive field in the plane of the sheet.

MBT was originally envisioned in the form of a mass memory, but some of the most difficult problems have been encountered in the basic memory function of readout. Therefore it becomes important to minimize readout to the extent possible by incorporating logic in the memory so that the magnetic bubbles representing information can be logically manipulated before readout is necessary, thus increasing the quality or informational content of each bit of readout. The use of bubbles themselves as logic variables for performing logic operations is based on the fact that close magnetic bubbles tend to repel each other. Thus, if alternate paths with varying degrees of preference are built into a propagation system, the direction which a bubble on one channel ultimately takes may be influenced by the presence or absence of a bubble on another closely spaced channel.

In the copending U.S. Patent application, Ser. No. 283,267, filed Aug. 24, 1972, by Robert C. Minnick et al, entitled "Magnetic Bubble Logic Family," the concept of conservative versus non-conservative bubble logic gates is discussed and all of the possible three input — three output or 3—3 conservative bubble logic gate functions are determined. A substantial portion of the disclosure in the copending application has been published in the Proceedings of the Sept. 19, 1972, Wescon conference in a paper entitled "Magnetic Bubble Logic" by R. C. Minnick et al.

These disclosures, incorporated herein by reference, describe simple realizations for each of thirty-one distinct classes of logic functions produced by 3—3 circuits and introduce a special symbology, adopted in this disclosure, for bubble logic circuits.

In another copending application, Ser. No. 311,402, filed Dec. 1, 1972, by R. C. Minnick now U.S. Pat. No. 3,866,191, entitled "Non-conservative Bubble Logic Circuits," a logical crossover circuit is disclosed which produces AND and NAND functions of two variables as byproducts. Two-rail logic is not involved, however, in any of the specific embodiments in that application.

The concept of two-rail logic is, of course, not new. The usefulness of having the variables together with their complements available for performing certain kinds of logic functions has been recognized and applied in principle before in electrical logic circuits.

SUMMARY OF THE INVENTION

The general purpose of the invention is to perform two-rail logic with magnetic bubbles to realize complementary nontrivial logic functions of two variables.

This purpose is accomplished according to the invention by providing four closely spaced bubble channels representing the variables and their complements linked by conditional bubble-transfer fields between adjacent channels responsive to bubble interactions.

In one embodiment, four field-accessed chevron circuit channels bearing complementary pairs of bubble data streams have three respective, interchannel, transfer fields of closely packed chevrons with transverse density gradients all in the same direction. The middle transfer field is offset upstream of the other transfer fields so that it is encountered first. The transfer fields tend to attract bubbles to the more closely packed areas in the absence of repulsion from a bubble already on the channel to which the bubble on the adjacent channel would normally be transferred. The AND-NAND function is realized with the gradients in one direction; OR-NOR is realized with the opposite direction.

DESCRIPTION OF THE PREFERRED EMBODIMENTS

Figure 1:
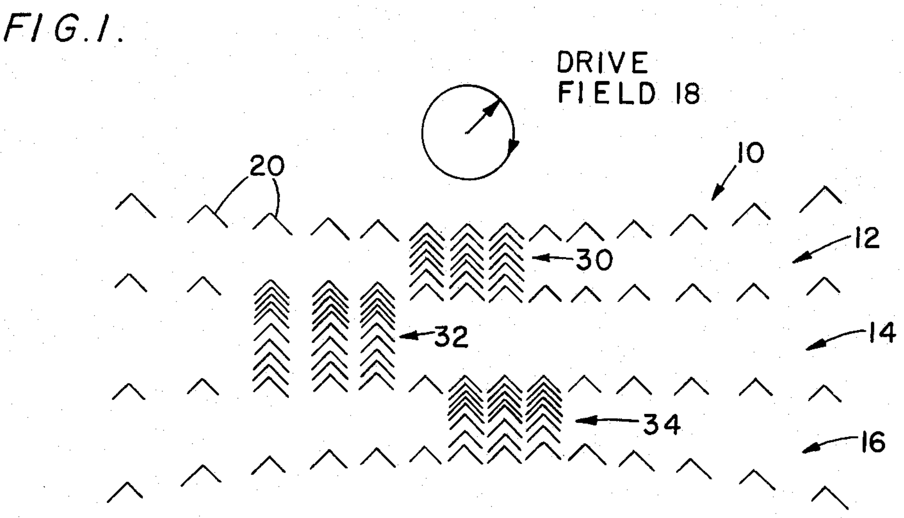
FIG. 1 is a schematic chevron circuit diagram illustrating two-rail AND-NAND logic.

FIG. 1 illustrates four closely spaced, field-accessed, chevron channels 10, 12, 14 and 16 each driven by a uniformly clockwise-rotating drive field 18 generated, for example, by a pair of orthogonal Helmholtz coil arrangements to which alternating current of opposite phase is applied, respectively. Each channel is composed of standard permalloy chevrons 20 laid end-to-end to define three consecutive, stable bubble positions per chevron, corresponding to effective drive field orientations in each drive field cycle. Although FIG. 1 shows only one chevron element per bubble position in each channel, the number of chevrons per bubble position is a well-known design parameter.

Figure 2:
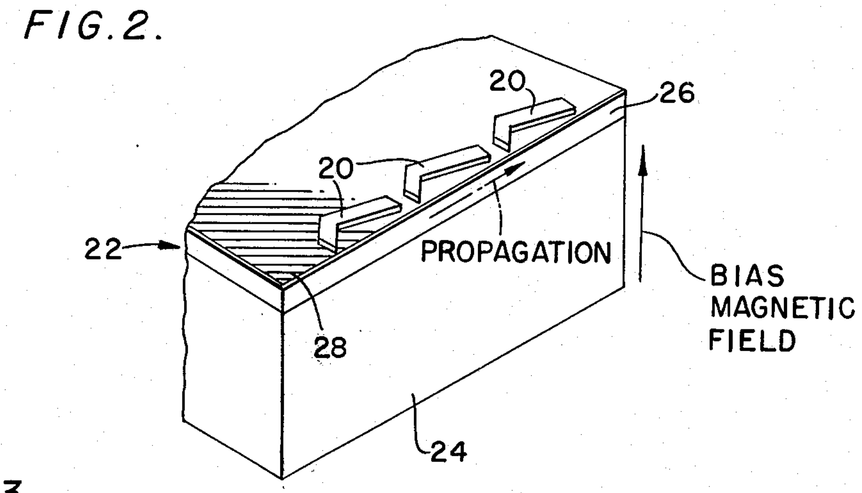
FIG. 2 is a fragmentary perspective view of a bubble chip embodying a portion of the circuit of FIG. 1.

The chevrons 20 are part of a bubble chip 22, shown in FIG. 2, comprising a substrate 24 of nonmagnetic garnet, an active epitaxial layer 26 of magnetic bubble garnet, and a spacing layer 28 of silicon oxide to which the permalloy chevrons 20 are bonded. A magnetic bias field of suitable strength orthogonal to the bubble garnet layer 26 enables bubbles (not shown) to be formed and maintained in the layer 26. The drive field 18 (FIG. 1) is applied in the plane of the bubble garnet layer 26 and causes bubbles to move or propagate from chevron to chevron (from left to right in FIG. 1) via consecutive, attracting poles on the chevron elements forming corresponding bubble positions.

In FIG. 1 the inputs (left-hand ends) of the paired channels 10 and 12 bear respective, complementary streams of bubble data representing the variable X and its complement or inverted value $\overline{X}$. Likewise, the inputs of the paired channels 14 and 16 bear the bubble streams for the complementary variables Y and $\overline{Y}$. The $\overline{X}$ and Y channels (12 and 14) are a adjacent. Between the complementary X and $\overline{X}$ channels 10 and 12, a transfer field 30 is inserted illustratively spanning three chevrons (nine bubble positions). The field 30 is composed of many closely spaced or stacked chevrons per bubble position. The spacing (transverse to the channels) between chevrons in the field 30 gradually decreases from channel 12 toward channel 10 so that the area density of chevrons (i.e., of the overlay material) increases toward the X-input channel 10. This change in density or density gradient has an "upward" direction, as viewed in FIG. 1. Similar transfer fields 32 and 34 are located respectively between channels 12 and 14 and channels 14 and 16. The directions of the density gradients for the transfer fields 30, 32 and 34 are all the same: upwards. The middle field 32 is offset upstream of the other two fields 30 and 34 so that field 32 is encountered first by bubbles on channels 12 and 14.

In operation, it should first be recognized that the paired inputs X and $\overline{X}$ can have only one bubble between them. The same is true of Y and $\overline{Y}$, of course. If the variable X is "not true", i.e., $\overline{X}$ is "1", a bubble will be present at the input to channel 12, but not to channel 10. Encountering the field 30, the bubble traverses the field seeking the higher chevron density and is transferred to channel 10. If X and Y are both "1", bubbles will be present only at the inputs to channels 10 and 14. Encountering first the field 32, the Y bubble transfers to channel 12. Bubbles on channels 10 and 12 approach field 30 simultaneously and the repulsion of the bubble already on channel 10 keeps the bubble on channel 12 from transferring as it otherwise would do in the absence of a bubble already on channel 10.

The output of channel 10 will always be a bubble, as either X or $\overline{X}$ will always be present, and one or the other will end at the output of channel 10, the X bubble by remaining on that channel or $\overline{X}$ by transfer from channel 12 to 10. The output of channel 12 will be a bubble only when both X and Y are "1"; the X bubble keeps the transferred Y bubble on channel 12, which represents the only possible way for channel 12 to have an output bubble. The remaining outputs follow in a similar manner; so that the "truth table" for the gate of FIG. 1 is given in the following Table I, where A, B, C and D represent the presence ("1") or absence ("0") of a bubble at the outputs (right-hand ends) of the channels 10, 12, 14 and 16, respectively, at a subsequent time corresponding to the simultaneous input of X and Y and their complements.

TABLE I

| X | $\overline{X}$ | Y | $\overline{Y}$ | A | B | C | D |
|---|---|---|---|---|---|---|---|
| 0 | 1 | 0 | 1 | 1 | 0 | 1 | 0 |
| 0 | 1 | 1 | 0 | 1 | 0 | 1 | 0 |
| 1 | 0 | 0 | 1 | 1 | 0 | 1 | 0 |
| 1 | 0 | 1 | 0 | 1 | 1 | 0 | 0 |

Thus, except for the constant, "trivial" outputs A and D, the outputs of the gate of FIG. 1 are the AND (XY) and NAND ($\overline{XY}$) functions of the two independent input variables.

Figure 3:
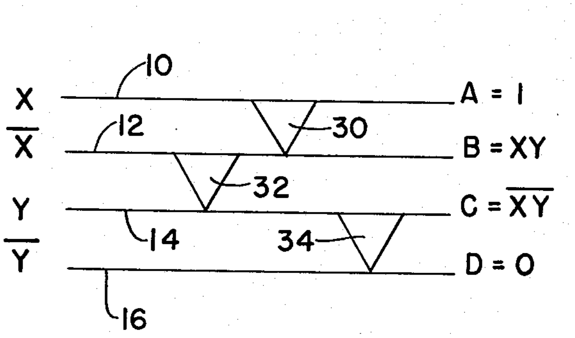
FIG. 3 is a schematic circuit diagram symbolically representing the circuit of FIG. 1.

The structure and functions of the gate of FIG. 1 are symbolized in the schematic diagram of FIG. 3, according to the symbology shown in the above-mentioned copending application, Ser. No. 283,267. The interchannel transfer fields 30, 32 and 34 are represented functionally by triangles whose bases indicate the denser regions and whose vertices indicate the less dense regions in the fields. The kind of transfer field represented by the triangle is one where a bubble reaching the vertex will prefer to traverse the field toward the base of the triangle in the absence of a bubble already at the base. Triangle fields having this function can be implemented by other schemes, for example, the strong "S" curve shown in the copending application, Ser. No. 283,267.

Figure 4:
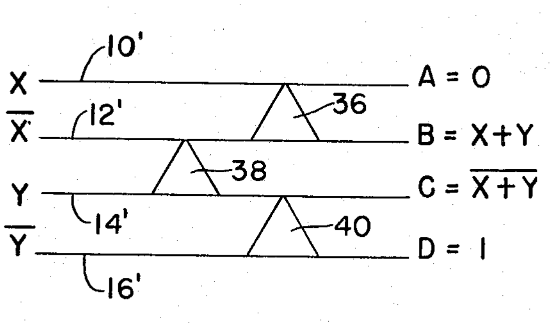
FIG. 4 is a schematic circuit diagram like FIG. 3 symbolically representing a circuit for performing two-rail OR-NOR logic.

FIG. 4 illustrates another bubble logic gate arrangement in the same symbolic format. The channels 10', 12', 14' and 16' are arranged similarly to those in FIGS. 1 and 3 with respect to the input pairs X, $\overline{X}$ and Y, $\overline{Y}$. In this embodiment, however, the preferred transfer directions are uniformly reversed, such that the similar triangles 36, 38 and 40 in FIG. 4 are upside down relative to those in FIG. 3. Those skilled in the art will recognize that the circuit of FIG. 4 would be the same as the circuit of FIG. 3 if the order of the inputs (from the top to the bottom channel) were reversed in FIG. 3.

In FIG. 4 an X bubble input to channel 10' will always end up at the output B of channel 12' by virtue of "downward" transfer via field 36 uninhibited by an $\overline{X}$ bubble. Thus output A of channel 10' is always "0". Similarly a Y bubble input to channel 14' always transfer downward via field 40 to output D on channel 16'. Conversely, $\overline{Y}$ bubble (Y=0), when present, always remains on the bottom channel 16', such that output D is always "1". Like the Y input to the other gate in FIGS. 1 and 3, an $\overline{X}$ bubble's journey through the gate in FIG. 4 dpends on the condition of the Y variable. If Y=0, then the $\overline{X}$ bubble at the input of channel 12' will freely transfer to channel 14' via field 38. Because, $\overline{Y}$=1 in the latter case, the transferred $\overline{X}$ bubble will output at C on channel 14' because the transfer field 40 is "inhibited". On the other hand, if Y=1, the $\overline{X}$ bubble will simply remain on its input channel 12' and exit at B since field 38 is inhibited. Output C thus only has an output when $\overline{X}$ and $\overline{Y}$ are both present; by DeMorgan's theorem the output of C is represented as $\overline{X+Y}$, the NOR function. Output B is "1" when either an X is present or an $\overline{X}$ bubble on channel 12', thus channel B represents the OR function X+y. The truth table for the gate of FIG. 4 is given in the following Table II.

TABLE II

| X | $\overline{X}$ | Y | $\overline{Y}$ | A | B | C | D |
|---|---|---|---|---|---|---|---|
| 0 | 1 | 0 | 1 | 0 | 0 | 1 | 1 |
| 0 | 1 | 1 | 0 | 0 | 1 | 0 | 1 |
| 1 | 0 | 0 | 1 | 0 | 1 | 0 | 1 |
| 1 | 0 | 1 | 0 | 0 | 1 | 0 | 1 |

The invention has been described in reference to specific circuits whose realization in different types of propagation systems besides chevrons is clearly feasible. Accordingly, the described embodiments are to be taken as illustrative rather than restrictive, the scope of the invention being indicated by the appended claims, and all changes which come within the meaning or range or equivalence of the claims are intended to be embraced therein.

We claim:

1. A bubble logic gate, comprising means defining first, second, third and fourth bubble channels adjacently arranged in numerical order, and means defining three conditional transfer paths between pairs of said channels respectively for unidirectionally transfering bubbles between said channels in the absence of a predetermined bubble-to-bubble interaction between the channels bridged by each said transfer path, transfer being uniformly in the same direction for each of said three conditional transfer paths, respectively, the transfer path defined between said second and third channels being offset upstream of said other transfer paths.

2. A bubble logic gate, comprising means defining four bubble channels, and means defining three conditional transfer paths between pairs of said channels respectively for unidirectionally transferring bubbles between said channels in the absence of a predetermined bubble-to-bubble interaction between the channels bridged by each said transfer path, the inputs of first and second ones of said channels corresponding to one logic variable and its complement respectively, and the inDuts of and third and fourth ones of said channels corresponding to another logic variable and its complement respectively.

3. The gate of claim 2, wherein said first, second, third and fourth channels are arranged in adjacent order.

4. The gate of claim 3, further comprising input names for applying a bubble bit representing one logic variable to said first channel, for applying a bubble bit representing the complement of said one variable to said second channel, for applying a bubble bit representing another logic variable to said third channel and for applying a bubble bit representing the complement of said other variable to said fourth channel.

5. The gate of claim 4, wherein the transfer path defined between said second and third channels is offset upstream of said other transfer paths.

6. The gate of claim 4, wherein the outputs of two of said channels define complementary nontrivial logic functions of said two logic variables.

7. The gate of claim 6, wherein said two channels providing complementary nontrivial logic function outputs are said second and third channels.

8. The gate of claim 7, wherein said logic functions are OR and NOR.

9. The gate of claim 7, wherein said logic functions are AND and NAND.

10. A two-rail logic bubble gate, comprising means defining four bubble channels, input means for applying bubble bits representing one logic variable and its complement respectively to first and second adjacent ones of said channels, means for applying bubble bits representing another logic variable and its complement respectively to third and fourth adjacent ones of said channels, and means defining three conditional unidirectional transfer paths between adjacent pairs of said channels respectively, the transfer path between the middle pair of channels being offset from the other transfer paths for independent operation, said middle pair of channels having outputs representing complementary nontrivial logic functions of said two logic variables.

11. The gate of claim 10, wherein said logic functions are OR and NOR.

12. The gate of claim 10, wherein said logic functions are AND and NAND.

* * * * *